(12) United States Patent
Stufflebeam, Jr. et al.

(10) Patent No.: US 9,135,471 B2
(45) Date of Patent: Sep. 15, 2015

(54) SYSTEM AND METHOD FOR ENCRYPTION AND DECRYPTION OF DATA

(75) Inventors: Kenneth W. Stufflebeam, Jr., Georgetown, TX (US); Amy Christine Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 716 days.

(21) Appl. No.: 12/721,355

(22) Filed: Mar. 10, 2010

(65) Prior Publication Data

US 2011/0225428 A1  Sep. 15, 2011

(51) Int. Cl.
  *G06F 21/72* (2013.01)
  *G06F 21/78* (2013.01)
  *G06F 21/62* (2013.01)

(52) U.S. Cl.
  CPC .............. *G06F 21/72* (2013.01); *G06F 21/78* (2013.01); *G06F 21/62* (2013.01)

(58) Field of Classification Search
  CPC .............. G06F 21/62; G06F 21/6209; G06F 2211/007; G06F 21/72; G06F 21/78
  USPC ........................................................ 713/190
  See application file for complete search history.

(56) References Cited

U.S. PATENT DOCUMENTS

| | | | |
|---|---|---|---|
| 5,818,939 A | 10/1998 | Davis | 713/192 |
| 5,930,358 A | 7/1999 | Rao | 713/193 |
| 6,202,157 B1* | 3/2001 | Brownlie et al. | 726/1 |
| 6,549,912 B1* | 4/2003 | Chen | 1/1 |
| 7,376,968 B2 | 5/2008 | Ritz et al. | |
| 7,987,349 B2 | 7/2011 | Zimmer et al. | |
| 2002/0080974 A1 | 6/2002 | Grawrock | 380/282 |
| 2003/0097578 A1* | 5/2003 | England et al. | 713/191 |
| 2003/0188179 A1* | 10/2003 | Challener et al. | 713/193 |
| 2004/0005061 A1 | 1/2004 | Buer et al. | |
| 2004/0019789 A1 | 1/2004 | Buer | |
| 2004/0260921 A1* | 12/2004 | Treadwell | 713/150 |
| 2005/0044433 A1 | 2/2005 | Dunstan | 713/320 |
| 2005/0058294 A1 | 3/2005 | Chen et al. | 380/277 |
| 2005/0111664 A1 | 5/2005 | Ritz et al. | |
| 2005/0137889 A1 | 6/2005 | Wheeler | 705/1 |
| 2005/0138404 A1* | 6/2005 | Weik et al. | 713/193 |

(Continued)

OTHER PUBLICATIONS

Omote et al., Protection and Recovery of Disk Encryption Key using Smart Cards, Apr. 2008, Fifth International Conference on Information Technology: New Generations, pp. 106-111.*

(Continued)

*Primary Examiner* — Kenneth Chang
(74) *Attorney, Agent, or Firm* — Baker Botts L.L.P.

(57) ABSTRACT

Systems and methods for reducing problems and disadvantages associated with traditional approaches to encryption and decryption of data are provided. A method for encryption and decryption of data, may include encrypting or decrypting data associated with an input/output operation based on at least one of an encryption key and a cryptographic function, wherein at least one of the encryption key and the cryptographic function are selected based on one or more characteristics associated with the data to be encrypted or decrypted. Another method may include encrypting an item of data based on at least one of a first-layer encryption key and a first-layer cryptographic function to produce first-layer encrypted data and encrypting the first-layer encrypted data based on at least one of a second-layer encryption key and a second-layer cryptographic function to produce second-layer encrypted data.

20 Claims, 1 Drawing Sheet

(56) References Cited

U.S. PATENT DOCUMENTS

| | | |
|---|---|---|
| 2005/0141715 A1* | 6/2005 | Sydir et al. .................... 380/255 |
| 2005/0142526 A1* | 6/2005 | Haruyama et al. ......... 434/307 A |
| 2005/0210500 A1* | 9/2005 | Stone .............................. 725/31 |
| 2005/0283826 A1* | 12/2005 | Tahan ............................... 726/2 |
| 2006/0041934 A1* | 2/2006 | Hetzler ............................. 726/9 |
| 2006/0088167 A1* | 4/2006 | Bade et al. .................... 380/281 |
| 2006/0093148 A1* | 5/2006 | Ko et al. ....................... 380/270 |
| 2006/0107032 A1* | 5/2006 | Paaske et al. ..................... 713/2 |
| 2006/0161769 A1* | 7/2006 | Hunter et al. ................. 713/164 |
| 2007/0113104 A1* | 5/2007 | Witt et al. ..................... 713/193 |
| 2007/0143223 A1 | 6/2007 | Bhave et al. |
| 2007/0208668 A1* | 9/2007 | Candelore ....................... 705/57 |
| 2008/0016307 A1* | 1/2008 | Takano et al. ................. 711/164 |
| 2008/0114993 A1 | 5/2008 | Shankar et al. |
| 2008/0148046 A1 | 6/2008 | Glancey |
| 2008/0181406 A1* | 7/2008 | Iyer et al. ...................... 380/277 |
| 2008/0263363 A1* | 10/2008 | Jueneman et al. ............ 713/184 |
| 2009/0006830 A1 | 1/2009 | Zimmer et al. |
| 2009/0031143 A1* | 1/2009 | Hodzic .......................... 713/193 |
| 2009/0070593 A1* | 3/2009 | Boshra et al. ................. 713/186 |
| 2009/0092252 A1* | 4/2009 | Noll et al. ..................... 380/277 |
| 2009/0106555 A1 | 4/2009 | Buer |
| 2009/0132776 A1 | 5/2009 | Kurauchi |
| 2009/0150683 A1* | 6/2009 | Markisohn et al. ........... 713/193 |
| 2010/0107249 A1 | 4/2010 | Krig |
| 2010/0169669 A1* | 7/2010 | Smith ........................... 713/193 |
| 2010/0185843 A1 | 7/2010 | Olarig et al. ...................... 713/2 |
| 2011/0035574 A1 | 2/2011 | Jevans et al. |
| 2011/0252223 A1 | 10/2011 | Zimmer et al. |

OTHER PUBLICATIONS

United States patent Application; Jaber et al.; U.S. Appl. No. 12/328,213; "Encryption Management in an Information Handling System"; pp. 47, Dec. 4, 2008.

United States patent Application; Stufflebeam et al.; U.S. Appl. No. 12/721,334; "System and Method for General Purpose Encryption of Data"; pp. 41, Mar. 10, 2010.

United States patent Application; Nelson et al.; U.S. Appl. No. 12/721,369; "System and Method for Pre-Operating System Encryption and Decrytionof Data"; pp. 39, Mar. 10, 2010.

United States patent Application; Nelson et al.; U.S. Appl. No. 12/721,390; "System and Method for Recovering From an Interrupted Encryption and Decryption Operation Performed on a Volume"; pp. 38, Mar. 10, 2010.

Kuhn et al.: Realizing property-based attestation and sealing with commonly available hard-and software; Proceeding STC '07 Proceedings of the 2007 ACM workshop on Scalable trusted computing; pp. 50-57; ACM Digital Library.

St. Clair et al.; Establishing and Sustaining System Integrity via Root of Trust Installation; Computer Security Applications Conference, 2007; ACSAC 2007: Dec. 10-14, 2007; pp. 19-29; IEEE Xplore.

Force et al., Portable Data Encryption Approaches, Nov. 1995, Microelectronics Communications Technology Producing Quality Products Mobile and Portable Power Emerging Technologies WESCON/'95, pp. 413-419.

\* cited by examiner

SYSTEM AND METHOD FOR ENCRYPTION AND DECRYPTION OF DATA

TECHNICAL FIELD

The present disclosure relates generally to information handling systems and, more particularly, to a system and method for general purpose encryption of storage devices.

RELATED APPLICATION

This application is related to copending Patent Application entitled "System and Method for General Purpose Encryption of Data," application Ser. No. 12/721,334, filed on the same date as the present application.

This application also is related to copending Patent Application entitled "System and Method for Pre-Operation System Encryption and Decryption of Data," application Ser. No. 12/721,369, filed on the same date as the present application.

This application is also related to copending Patent Application entitled "System and Method for Recovering from an Interrupted Encryption of Decryption Operation Performed on a Volume," application Ser. No. 12/721,390, filed on the same date as the present application.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often employ data encryption when storing data in order to protect the data from being accessed by unauthorized persons. However, traditional approaches to encryption and storage of encrypted data have many disadvantages. For example, many traditional approaches employing hardware-based encryption generally allow only a particular encryption algorithm to be applied and are tied to a specific component of hardware. In addition, many traditional approaches do not allow for true full-volume encryption of data, as system-specific data is often left unencrypted in traditional approaches to allow for system startup and boot. Furthermore, secure storage of objects (keys and authentication objects) that protect data must often be stored in a secure storage location that requires specific security protocols and authentication methods.

SUMMARY

In accordance with the teachings of the present disclosure, the disadvantages and problems associated with encryption and decryption of data have been substantially reduced or eliminated.

In accordance with one embodiment of the present disclosure, an information handling system may include a processor, a memory communicatively coupled to the processor, and an encryption accelerator communicatively coupled to the processor. The encryption accelerator may be configured to encrypt and decrypt information in accordance with a plurality of cryptographic functions, receive a command from the processor to perform an encryption or decryption task upon data associated with an input/output operation, and in response to receiving the command, encrypt or decrypt the data associated with the input/output operation based on a particular one of the plurality of cryptographic functions.

In accordance with another embodiment of the present disclosure, a method for encryption and decryption of data, may include receiving a command by an encryption accelerator to perform an encryption or decryption task upon data associated with an input/output operation, the command designating a particular one of a plurality of cryptographic functions stored on the encryption accelerator. The method may also include, in response to receiving the command, encrypting or decrypting the data associated with the input/output operation based on the particular one of the plurality of cryptographic functions.

In accordance with yet another embodiment of the present disclosure, an encryption accelerator may include logic for encrypting and decrypting information in accordance with a plurality of cryptographic functions. The encryption accelerator may also include logic for receiving a command from the processor to perform an encryption or decryption task upon data associated with an input/output operation. The encryption accelerator may further include logic for encrypting or decrypting the data associated with the input/output operation based on a particular one of the plurality of cryptographic functions in response to receiving the command.

In accordance with yet another embodiment of the present disclosure, an information handling system may include a processor, a memory communicatively coupled to the processor, an encryption accelerator communicatively coupled to the processor, and a computer-readable medium communicatively coupled to the processor. The encryption accelerator may be configured to encrypt or decrypt data in response to a command from the processor to perform an encryption or decryption task upon data associated with an input/output operation. The computer-readable medium may have instructions stored thereon, the instructions configured to, when executed by the processor: (i) monitor for input/output operations occurring prior to loading of an operating system into the memory; and (ii) in response to detection of an input/output operation, communicate a command to the encryption accelerator to perform an encryption or decryption task upon data associated with an input/output operation.

In accordance with yet another embodiment of the present disclosure, a method for pre-operating system encryption and decryption of data, may include loading a program of instructions stored in a basic input/output system, the program of instructions configured to, when executed by a processor: (i) monitor for an input/output operation occurring prior to loading of an operating system into a memory communicatively coupled to the processor; and (ii) in response to detection of an input/output operation, communicate a command to an encryption accelerator communicatively coupled to the processor to perform an encryption or decryption task upon data associated with an input/output operation; wherein the encryption accelerator is configured to encrypt or decrypt data to perform the encryption or decryption task upon data associated with an input/output operation in response to the command.

In accordance with yet another embodiment of the present disclosure, a basic input/output system (BIOS) for use in an information handling system, may include logic for monitoring for an input/output operation occurring prior to loading of an operating system by the information handling system, and logic for communicating, in response to detection of an input/output operation, a command to an encryption accelerator to perform an encryption or decryption task upon data associated with an input/output operation. The encryption accelerator may configured to encrypt or decrypt data to perform the encryption or decryption task upon data associated with an input/output operation in response to the command.

In accordance with yet another embodiment of the present disclosure, an information handling system may include a processor, a memory communicatively coupled to the processor, and a computer-readable medium communicatively coupled to the processor. The computer-readable medium may have instructions stored thereon, the instructions configured to, when executed by the processor: (i) periodically store, during an encryption or decryption operation performed on the computer-readable medium, one or more variables indicative of an encryption status of a volume of the computer-readable medium; (ii) determine, based on the one or more variables, whether the volume is in a partially encrypted or decrypted state; and (iii) in response to a determination that the volume is in a partially encrypted or decrypted state, boot from the volume and continue the encryption or decryption operation.

In accordance with yet another embodiment of the present disclosure, a method for recovering from an interrupted encryption or decryption operation performed on a volume may include periodically storing, during an encryption or decryption operation performed on the volume, one or more variables indicative of an encryption status of the volume. The method may also include determining, based on the one or more variables, whether the volume is in a partially encrypted or decrypted state. The method may further include booting from the volume and continuing the encryption or decryption operation in response to a determination that the volume is in a partially encrypted or decrypted state.

In accordance with yet another embodiment of the present disclosure, a system for recovering from an interrupted encryption or decryption operation performed on a volume may include logic for periodically storing, during an encryption or decryption operation performed on the volume, one or more variables indicative of an encryption status of the volume. The system may also include logic for determining, based on the one or more variables, whether the volume is in a partially encrypted or decrypted state. The system may further include logic for booting from the volume and continuing the encryption or decryption operation in response to a determination that the volume is in a partially encrypted or decrypted state.

In accordance with yet another embodiment of the present disclosure, an information handling system may include a processor, a memory communicatively coupled to the processor, and a computer-readable medium coupled to the processor. The computer-readable medium may have stored thereon instructions for managing encryption and decryption tasks, the instructions configured to, when executed by the processor, encrypt or decrypt data associated with an input/output operation based on at least one of an encryption key and a cryptographic function, wherein at least one of the encryption key and the cryptographic function are selected based on one or more characteristics associated with the data to be encrypted or decrypted.

In accordance with yet another embodiment of the present disclosure, a method for encryption and decryption of data, may include encrypting or decrypting data associated with an input/output operation based on at least one of an encryption key and a cryptographic function, wherein at least one of the encryption key and the cryptographic function are selected based on one or more characteristics associated with the data to be encrypted or decrypted.

In accordance with yet another embodiment of the present disclosure, an information handling system may include a processor, a memory communicatively coupled to the processor, and a computer-readable medium coupled to the processor. The computer-readable medium may have stored thereon instructions for encrypting an item of data, the instructions configured to, when executed by the processor: (i) encrypt the item of data based on at least one of a first-layer encryption key and a first-layer cryptographic function to produce first-layer encrypted data; and (ii) encrypt the first-layer encrypted data based on at least one of a second-layer encryption key and a second-layer cryptographic function to produce second-layer encrypted data.

In accordance with yet another embodiment of the present disclosure, a method may include encrypting an item of data based on at least one of a first-layer encryption key and a first-layer cryptographic function to produce first-layer encrypted data and encrypting the first-layer encrypted data based on at least one of a second-layer encryption key and a second-layer cryptographic function to produce second-layer encrypted data.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more busses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
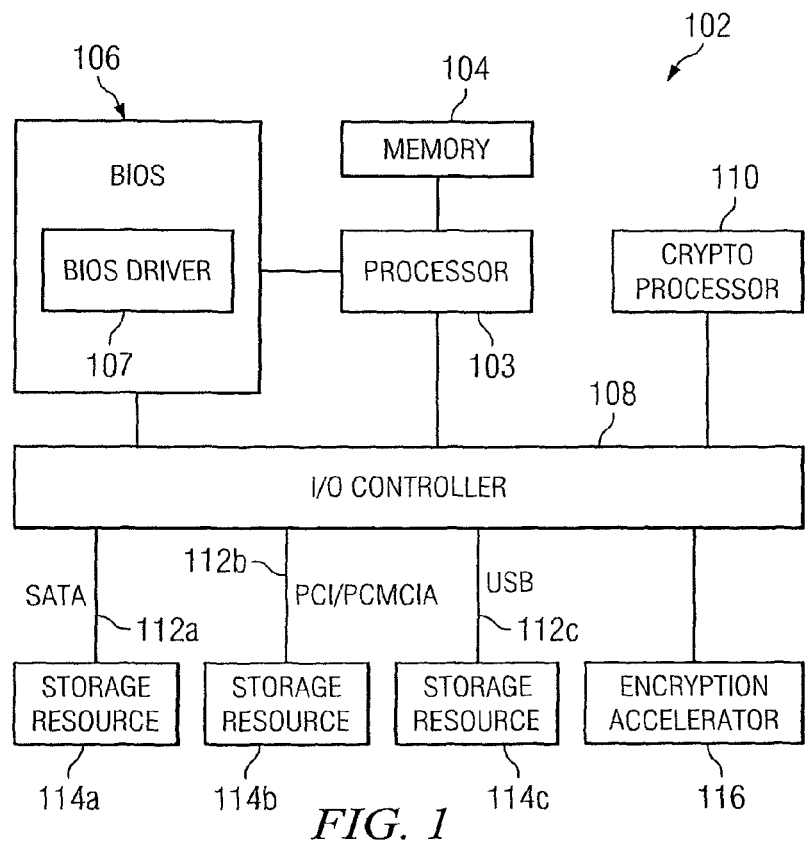
FIG. 1 illustrates a block diagram of an example information handling system, in accordance with embodiments of the present disclosure.

FIG. 1 illustrates a block diagram of an example information handling system 102, in accordance with embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory 104 communicatively coupled to processor 103, a basic input/output system (BIOS) 106 communicatively coupled to processor 103, an input/output (I/O) controller 108 communicatively coupled to processor 103 and BIOS 106, a cryptoprocessor 110 communicatively coupled to I/O controller 108, one or more storage resources 114 communicatively coupled to I/O controller 108 via respective busses 112, and an encryption accelerator 116.

Processor 103 may include any system, device, or apparatus configured to interpret and/or execute program instructions and/or process data, and may include, without limitation a microcontroller, microprocessor, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory system 104, storage medium 106, and/or another component of information handling system 102.

Memory 104 may be communicatively coupled to processor 103 and may comprise any system, device, or apparatus configured to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

BIOS 106 may be communicatively coupled to processor 103 and may comprise any system, device, or apparatus configured to store instructions to be executed by processor 103 when information handling system 102 is booted and/or powered on. In some embodiments, BIOS 106 may be boot firmware and may be configured to be the first code executed by processor 103 when information handling system 102 is booted and/or powered on. The initial function of BIOS 106 may be to identify, test, and initialize components of information handling system 102 (e.g., video display cards, storage resources 114, and other hardware). As part of such initialization, BIOS code may be configured to set components of information handling system 102 into a known state, so that software (e.g., an operating system) stored on compatible media (e.g., storage resources 114) can be loaded into memory 104, executed by, processor 103, and given control of information handling system 102.

As shown in FIG. 1, BIOS 106 may include BIOS driver 107. BIOS driver 107 may comprise any system, device, or apparatus configured to implement encryption for storage resources 114 for input/output operations occurring prior to completion of operating system boot up (and thus permitting true full-volume encryption of storage resources 114), as is described in greater detail below.

I/O controller 108 may be communicatively coupled to processor 103 and BIOS 106 and may comprise any system, device, or apparatus configured to serve as an interface and/or hub between processor 103 and certain components of information handling system 102 (e.g., cryptoprocessor 110, storage resources 114, encryption accelerator 116, and others). In some embodiments, I/O controller 108 may include or be implemented as part of a southbridge chip set.

Cryptoprocessor 110 may be communicatively coupled to I/O controller 110 and may include any system, device, or apparatus configured to carry out cryptographic operations on data communicated via I/O controller 108. In some embodiments, cryptoprocessor 110 may be compliant with the Trusted Platform Module specification, a successor specification, and/or any other similar specification. In some embodiments, cryptoprocessor 110 may be configured to generate random numbers, generate encryption keys (e.g., RSA keys), generate and maintain hash key tables of hardware and software components of an information handling system, generate and maintain configuration parameters associated with hardware and software components of an information handling system, wrap (e.g., encrypt) keys, unwrap (e.g., decrypt) keys and/or store keys (e.g., endorsement key, storage root key, attestation identity keys, storage keys).

Storage resources 114a, 114b, and 114c (which may individually be referred to herein as storage resource 114 or collectively referred to herein as storage resources 114) may each be communicatively coupled to I/O controller 108 via an associated bus 112, and may include any system, device, or apparatus configured to retain program instructions or data for a period of time (e.g., a computer-readable medium). In some embodiments, one or more of storage resources 114 may include a hard disk drive, a magnetic tape library, an optical disk drive, a magneto-optical disk drive, a compact disk drive, a DVD disk drive, a FLASH drive and/or any other suitable computer-readable medium.

Busses 112a, 112b, and 112c (which may individually be referred to herein as bus 112 or collectively referred to herein as busses 112) may comprise any system, device, or apparatus configured to transfer data between components of information handling system 102. For example, as shown in FIG. 1, busses 112 may in some embodiments include a serial advanced technology attachment (SATA) bus, a Peripheral Component Interconnect (PCI)/Personal Computer Memory Card International Association bus, Universal Serial Bus (USB). Busses 112 may also include other types of busses, including without limitation, a Small Computer System Interface (SCSI) bus, FireWire (IEEE 1394) bus, InfiniBand bus, or any other suitable bus.

Encryption accelerator 116 may be communicatively coupled to I/O controller 116 and may comprise any system, device, or apparatus configured to encrypt data for storage on one or more of storage resources 114, and/or decrypt data read from one or more of storage resources 114. In some embodiments, encryption accelerator 116 may serve as a general purpose encryption accelerator that is configured to execute multiple cryptographic functions (e.g., encryption algorithms, algorithm modes, cryptographic hashes, and/or cryptographic sign functions), and/or may be configured to load encryption keys (e.g., encryption keys provided by a software program or other entity or encryption keys stored and/or generated by cryptoprocessor 110) for encryption tasks. In these and other embodiments, a particular cryptographic function and/or a key may be specified as a function of a task performed by encryption accelerator 116. Accordingly, encryption accelerator 116 may have stored thereon a plurality of cryptographic functions that may be executed. In embodiments in which encryption keys may be loaded into encryption accelerator 116 in order to perform encryption tasks, such keys may be firewalled and read access to such keys may be disabled such that the keys remain secure. Accordingly, keys may be inserted into encryption accelerator 116 and/or written over, but cannot be read. Also, in embodiments in which encryption keys may be loaded into encryption accelerator 116 in order to perform encryption tasks, a task and/or owner's ability to insert a key may be authenticated to encryption accelerator 116 prior to acceptance of the key.

Figure 2:
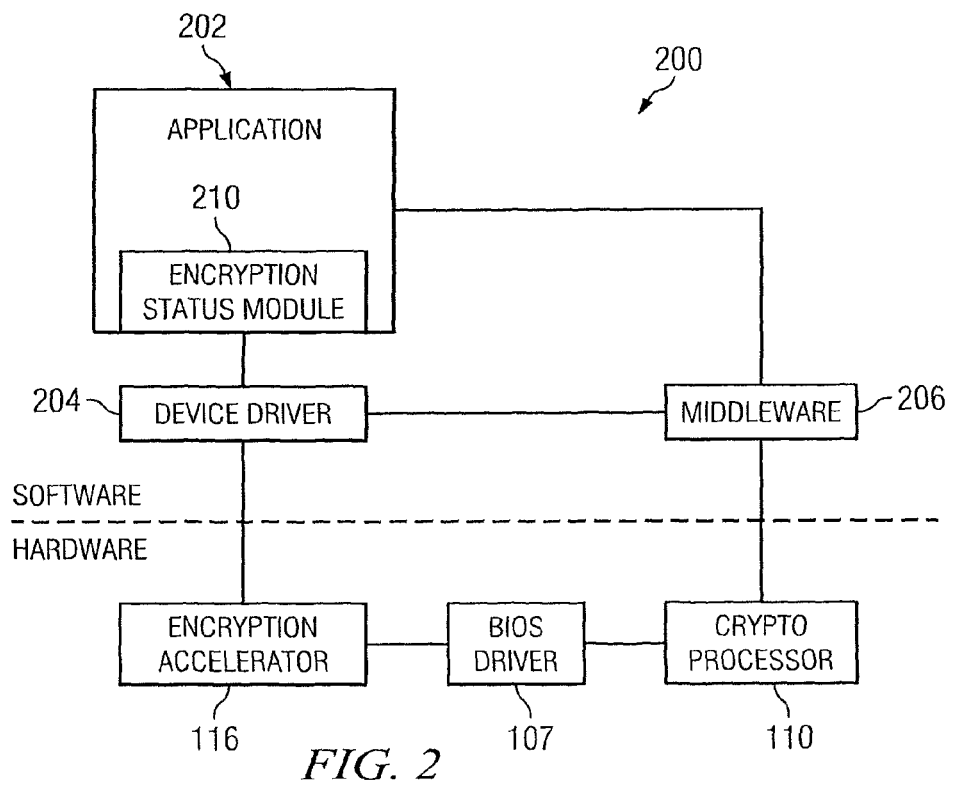
FIG. 2 illustrates a block diagram of an example software/hardware stack for performing encryption and decryption of input/output operations for storage resources of an information handling system, in accordance with embodiments of the present disclosure.

FIG. 2 illustrates a block diagram of an example software/hardware stack 200 for performing encryption and decryption of input/output operations for storage resources 114 of information handling system 102, in accordance with embodiments of the present disclosure.

In operation, information handling system 102 may be configured such that input/output operations involving storage resources 114 (e.g., read and write operations) are encrypted or decrypted by an encryption task executed by encryption accelerator 116 based on a specified cryptographic function and/or encryption key. For example, processor 103 or another component of information handling system 102 may execute application 202, device driver 204, and/or middleware 206 to facilitate encryption and decryption. Each of application 202, device driver 204, and middleware 206 may be programs of instructions stored on one or more of storage resources 114 or other computer readable media, the programs of instructions operable to, when executed, perform the functionality described below.

Application 202 may include an operating system or specialized application program configured to manage and/or control the encryption and decryption of data read from or written to storage resources 114, as described in greater detail below. Middleware 206 may serve as an interface between application 202 and cryptoprocessor 110 allowing application 202 to interact with cryptoprocessor 110 (e.g., device driver 204 may provide an application programming interface to application 202 that translates generalized commands or instructions into those that may be recognized by encryption accelerator 116). Device driver 204 may serve as an interface between application 202 and encryption accelerator 116 and between middleware 206 and device driver 204 allowing application 202 and middleware 206 to interact with encryption accelerator 116 (e.g., device driver 204 may provide an application programming interface to application 202 and middleware 206 that translates generalized commands or instructions into those that may be recognized by encryption accelerator 116).

In operation, application 202 executing on processor 103 may direct that a write operation to a storage resource 114 is to be encrypted or that a read operation from a storage resource 114 is to be decrypted. Application 202 or another hardware or software component of information handling system 102 may provide an encryption key for the encryption or decryption task. For example, in some embodiments, each storage resource 114 of information handling system 102 may have a unique key associated with it that may be provided for I/O operations associated with such storage resource 114. In other embodiments, each bus 112 of information handling system 102 may have a unique key associated with it that may be provided for I/O operations associated with such bus 112. In these and alternative embodiments, an encryption key provided for a read operation may be the same as that used to write data to the storage resource 114, or part of a key pair of the encryption key used to write data to the storage resource 114. In the foregoing embodiments and other embodiments, the selected key may also be based on a security policy, as described in greater detail below. In these and other embodiments, application 202 may, via middleware 206, instruct cryptoprocessor 110 to provide an encryption key stored on cryptoprocessor 110 for the encryption or decryption task and/or may instruct cryptoprocessor 110 to unwrap an encryption key so that the encryption key may be used for the encryption or decryption task.

In some embodiments, cryptoprocessor 110 may authenticate that application 202, middleware 206, processor 103 and/or a user of information handling system 102 is authorized to provide an encryption key (e.g., the cryptoprocessor 110 may access platform configuration registers integral to the cryptoprocessor 110 to determine if the request originates from a trusted source and/or is requested I/O access to a permitted storage resource 114).

The selected encryption key may be communicated by application 202 to encryption accelerator 116 (e.g., device driver 204) where it may be used in connection with a task to encrypt or decrypt I/O data, as described in greater detail below.

In addition to the foregoing, in connection with an I/O operation, application 202 may instruct encryption accelerator 116 to perform an encryption or decryption task. In some embodiments, processor 103 or another component of information handling system 102 may communicate to encryption accelerator 116 a designation of a particular cryptographic function to be applied in executing the encryption or decryption task. In these and other embodiments, the designated cryptographic function may be based on a security policy, as is described in greater detail below. Based on the encryption key and/or the designated cryptographic function, encryption accelerator 116 may encrypt or decrypt data associated with the I/O operation. In the same or alternative embodiments, encryption accelerator 116 may authenticate that a requestor (e.g., application 202) of an encryption task is authorized to initiate an encryption task. After encryption or decryption of data, data may be stored to a storage resource 114.

While the foregoing paragraphs contemplate that encryption and decryption of data may be initiated by software (e.g., application 202, device driver 204, middleware 206) executing on processor 103, such encryption and decryption may not be possible during boot-up/power-on of information handling system 102, as there may exist portions of the boot-up/power-on of information handling system 102 in which processor 103 has not loaded application 202, device driver 204, and/or middleware 206. However, BIOS driver 107 stored in BIOS 106 may provide a mechanism by which encryption and decryption may also take place before processor 103 has begun executing application 202, device driver 204, and middleware 206, and may also provide mechanisms for encryption of application 202, device driver 204, and middleware 206 while stored on one or more storage resources 114 and/or other computer readable media and decryption of application 202, device driver 204, middleware 206 when ready from storage resources 114 and/or other computer readable media for execution by processor 103.

BIOS driver 107 may include a program of instructions configured to, when executed by processor 103, manage and/or control the encryption and decryption of data read from or written to storage resources 114 prior to the invocation of application 202 (e.g., prior to invocation of an operating system during boot-up/power-on), as described in greater detail below. Upon boot-up/power-on of information handling system 102, processor 103 may load BIOS driver 107 from BIOS 106 and execute BIOS driver 107. BIOS driver 107 may be configured to detect or otherwise intercept I/O operations associated with storage resources 114 occurring during the boot-up/power-on process of information handling system 102 may be encrypted and decrypted by encryption accelerator 116 in a manner similar to that described above. For example, in connection with a pre-boot I/O operation, BIOS driver 107 may instruct encryption accelerator 116 to perform an encryption or decryption task. In some embodiments, BIOS driver 107 may be configured to designate a particular cryptographic function to be applied in executing an encryption or decryption task associated with pre-boot I/O. In addition, BIOS driver 107 may designate an encryption key, or instruct cryptoprocessor 110 to provide an encryption key for the pre-boot encryption or decryption task. In these and other embodiments, the designated cryptographic function and/or encryption key selected may be based on a security policy, as is described in greater detail below. In some embodiments, the encryption key itself may be sealed and stored in BIOS 106, and BIOS driver 107 may include instructions to unseal the encryption key so that the key may be loaded into encryption accelerator 116 and used to encrypt and decrypt pre-boot I/O operations. Based on the encryption key and/or the designated cryptographic function, encryption accelerator 116 may encrypt or decrypt data associated with the pre-boot I/O operation. In the same or alternative embodiments, encryption accelerator 116 may authenticate that BIOS 106, BIOS driver 107, and/or processor 103 is authorized to initiate an encryption task (e.g., encryption accelerator 116 may determine whether BIOS 106 has indicia that the BIOS 106/BIOS driver 107 is a trusted source).

Such pre-boot encryption and decryption may permit true full-volume encryption (FVE) and full-disk encryption (FDE) not available in traditional approaches to storage resource encryption. In traditional approaches, true FVE and FDE is not available, as such approaches do not permit true encryption of all data on a storage resource (e.g., such approaches do not provide for encryption and decryption of a master boot record or other portions of a boot volume). However, BIOS driver 107 may overcome this disadvantage as it enables a master boot record and other pre-boot/pre-OS data (e.g., application 202, device driver 204, middleware 206) stored on a storage resource 114 to be encrypted and stored, as well as read and decrypted during the boot process, such that processor 103 may read the master boot record and other pre-boot/pre-OS data (e.g., application 202, device driver 204, middleware 206).

As shown in FIG. 2, application 202 may include an encryption status module 210. Encryption status module 210 may be one or more instructions configured to, when executed by processor 103, determine an encryption status of a volume (e.g., a boot volume) of a storage resource 114. During encryption or decryption of data stored on a storage resource 114, the encryption or decryption process may be interrupted (e.g., due to a power failure or other event). In order to track the status of encryption or decryption task for a volume, encryption status module 210 may, during an encryption or decryption task, periodically store one or more variables indicative of encryption status. For example, in some embodiments, encryption status module 210 may periodically store a variable indicating whether a particular volume is partially encrypted or decrypted. In the same and other embodiments, encryption status module 210 may periodically store another variable indicating a portion of the volume that has been encrypted or decrypted (e.g., a variable indicating an address of the last encrypted or decrypted sector of the volume). In alternative embodiments, a single variable may indicate a portion of the volume that has been encrypted or decrypted and whether the volume is partially encrypted or decrypted (e.g., a value of "0" or a value equal the last address may indicate an address of the last encrypted or decrypted sector of the volume as well as indicating that no partial encryption or decryption exists). In some or all of these embodiments, the one or more variables may be written to the volume (e.g., a boot volume) being encrypted or decrypted.

In addition, encryption status module 210 may be configured to, upon boot-up/power-on of information handling system 102, determine whether a particular volume is in a partially encrypted or decrypted state and, if in a partially encrypted or decrypted state, boot from the volume in its partially encrypted or decrypted state. To determine whether a particular volume is in a partially encrypted or decrypted state, BIOS driver 107 may read the master boot record signature for the volume and test for a specific value in the signature. If the specific value exists, the volume is not encrypted. However, if the specific value does not exist, then BIOS driver 107 may decrypt the signature and test again to determine if the decrypted signature has the specific value. If the specific value exists in the decrypted signature, the BIOS driver 107 analyzes the signature to determine if a particular variable exists, wherein the particular variable designates a boundary between encrypted data and decrypted data on a partially encrypted volume. The BIOS driver 107 may decrypt decrypted data on a partially or fully encrypted volume.

As described above, a designated cryptographic function and/or key may be based on a security policy. A security policy for information handling system 102 may define whether an encryption or decryption task is to be executed and the designated cryptographic function and/or encryption key to be used in connection with such an encryption or decryption task based on one or more of: a user logged into information handling system 102, characteristics of a storage resource 114 associated with the task, or characteristics regarding the directory path of the data to be written or read (e.g., folder/directory, file, etc.). Among the characteristics of a storage resource 114 upon which a policy may be based are a port to which the particular storage resource 114 is coupled, the type of storage resource 114 (e.g., USB, FireWire, SATA, PCI/PCMCIA, etc.), manufacturer of storage resource 114, model of storage resource 114, serial number of storage resource 114, and a file type of the data to be encrypted or decrypted (e.g., based on file extension and/or type of data to be stored, such as image file, video file, text file, executable file, etc.) and/or any other suitable characteristic. In some embodiments, such a policy may be established by an administrator or other person at a management console remote from information handling system 102, from which it may be communicated to information handling system 102 and/or other information handling systems, where such policy may be enforced, as described herein.

In addition, a security policy may also provide that multiple layers of encryption are to be applied to data written to a storage resource. For example, data to be stored on a storage resource 114 may be encrypted by encryption accelerator 116 or another component of information handling system 102 based on a first-layer encryption key and/or cryptographic function, and such encrypted data may itself then be encrypted by encryption accelerator 116 or another component of information handling system 102 based on a second-layer encryption key and/or cryptographic function such that the data is then "wrapped" by two layers of encryption. In some embodiments, more than two layers of encryption may be applied. When the multiple-layer encrypted data is later read, it may be decrypted at each layer in reverse order. In the same or alternative embodiments, each layer may be bound to or unique to a physical or logical component of information handling system 102.

As a specific example, a first-layer encryption key and/or cryptographic function may be bound to a particular storage resource 114, a second-layer encryption key and/or cryptographic function may be bound to the particular information handling system 102 (e.g., by means of cryptoprocessor 110), and a third-layer encryption key and/or cryptographic function may be bound to a presently logged-in user of information handling system 102. In this specific example, such encrypted data may later be decrypted and read only if accessed by the same user from the same storage resource 114 coupled to the same information handling system 102.

A component of information handling system 102 may include an interface, logic, and/or other suitable elements. An interface receives input, sends output, processes the input and/or output, and/or performs other suitable operation. An interface may comprise hardware and/or software. Logic performs the operations of the component, for example, executes instructions to generate output from input. Logic may include hardware, software, and/or other logic. Logic may be encoded in one or more tangible computer readable storage media and may perform operations when executed by a processor or other component.

Although the disclosed embodiments have been described in detail, it should be understood that various changes, substitutions and alterations can be made to the embodiments without departing from their spirit and scope.

What is claimed is:

1. An information handling system, comprising:
 a processor;
 a memory communicatively coupled to the processor;
 a storage resource communicatively coupled to the processor, the storage resource having a sealed encryption key that is unique to the storage resource and associated only with the storage resource; and
 a computer-readable medium coupled to the processor and having stored thereon instructions for managing encryption and decryption tasks, the instructions configured to, when executed by the processor;
 encrypt or decrypt data associated with an input/output operation from the storage resource based on the unique sealed encryption key and a cryptographic function, the unique sealed encryption key is read access disabled, the cryptographic function is selected based on one or more characteristics associated with the data to be encrypted or decrypted;
 determine an encryption status of a volume of the storage resource;
 store a variable indicating whether the volume is partially encrypted or decrypted; and
 boot from the volume of the storage resource and continue encryption or decryption of the data in response to a determination that the variable indicates that the volume is partially encrypted or decrypted, wherein completion of the encryption or decryption of the data results in full volume encryption (FVE) or full disk encryption (FDE).

2. The information handling system according to claim 1, the one or more characteristics comprising: a user associated with the information handling system, a port to which the storage resource associated with the input/output operation is coupled, a type of the storage resource associated with the input/output operation, a manufacturer of the storage resource associated with the input/output operation, a model of the storage resource associated with the input/output operation, a serial number of the storage resource associated with the input/output operation, a logical path of the storage resource associated with the input/output operation, and any other characteristic of the storage resource associated with the input/output operation.

3. The information handling system according to claim 1, wherein the cryptographic function includes at least one of an encryption algorithm, an algorithm mode, a cryptographic hash, and a sign function.

4. The information handling system according to claim 1, wherein the one or more characteristics are determined based on a security policy.

5. The information handling system according to claim 4, wherein the security policy is established by an administrator at a management console remote from the information handling system and communicated to the information handling system.

6. A method for encryption and decryption of data, comprising:
 encrypting or decrypting data associated with an input/output operation from a storage resource based on a unique sealed encryption key and a cryptographic function, the unique sealed encryption key is unique to the storage resource and associated only with the storage resource, the unique sealed encryption key is read access disabled, the cryptographic function is selected based on one or more characteristics associated with the data to be encrypted or decrypted;
 determining an encryption status of a volume of a storage resource;
 storing a variable indicating whether the volume is partially encrypted or decrypted; and
 booting from the volume of the storage resource and continuing encrypting or decrypting the data in response to a determination that the variable indicates that the volume is partially encrypted or decrypted, wherein completion of the encrypting or decrypting of the data results in full volume encryption (FVE) or full disk encryption (FDE).

7. The method according to claim 6, the one or more characteristics comprising: a user associated with an information handling system, a port to which the storage resource associated with the input/output operation is coupled, a type of the storage resource associated with the input/output operation, a manufacturer of the storage resource associated with the input/output operation, a model of the storage resource associated with the input/output operation, a serial number of the storage resource associated with the input/output operation, a logical path of the storage resource associated with the input/output operation, and a file type of the data to be encrypted or decrypted.

8. The method according to claim 6, wherein the cryptographic function includes at least one of an encryption algorithm, an algorithm mode, a cryptographic hash, and a sign function.

9. The method according to claim 6, wherein the one or more characteristics are determined based on a security policy.

10. The method according to claim 9, further comprising:
establishing the security policy by an administrator at a management console remote from an information handling system; and
communicating the security policy to the information handling system.

11. An information handling system, comprising:
a processor;
a memory communicatively coupled to the processor;
a storage resource communicatively coupled to the processor, the storage resource having a sealed encryption key that is unique to the storage resource and associated only with the storage resource; and
a computer-readable medium coupled to the processor and having stored thereon instructions for encrypting an item of data from the storage resource, the instructions configured to, when executed by the processor:
encrypt the item of data based on a first-layer encryption key and a first-layer cryptographic function to produce first-layer encrypted data, the first-layer encryption key being the unique sealed encryption key, the unique sealed encryption key is read access disabled; and
encrypt the first-layer encrypted data based on at least one of a second-layer encryption key and a second-layer cryptographic function to produce second-layer encrypted data;
determine an encryption status of a volume of the storage resource;
store a variable indicating whether the volume is partially encrypted or decrypted; and
boot from the volume of the storage resource and continue encryption of items of data from the storage resource in response to a determination that the variable indicates that the volume is partially encrypted or decrypted, wherein completion of the encryption of the items of data results in full volume encryption (FVE) or full disk encryption (FDE).

12. The information handling system according to claim 11, the instructions further configured to encrypt the second-layer encrypted data based on at least one of a third-layer encryption key and a third-layer cryptographic function to produce third-layer encrypted data.

13. The information handling system according to claim 11, wherein the first-layer encryption key and the first-layer cryptographic function are unique to a first component of the information handling system and the second-layer encryption key and the second-layer cryptographic function are unique to a second component different than the first component.

14. The information handling system according to claim 13, wherein each of the first component and the second component comprises one of: a user of the information handling system, the processor of the information handling system, the storage resource of the information handling system, a bus via which the storage resource of the information handling system is coupled, a cryptoprocessor of the information handling system, and an encryption accelerator of the information handling system.

15. The information handling system according to claim 11, the instructions further configured to:
decrypt the second-layer encrypted data based on at least one of the second-layer encryption key and the second-layer cryptographic function to produce first-layer encrypted data; and
decrypt the first-layer encrypted data based on at least one of the first-layer encryption key and the first-layer cryptographic function to produce the item of data.

16. A method for encrypting data, comprising:
encrypting an item of data from a storage resource based on a first-layer encryption key and a first-layer cryptographic function to produce first-layer encrypted data, the first-layer encryption key being a unique sealed encryption key, the unique sealed encryption key is unique to the storage resource and associated only with the storage resource, the unique sealed encryption key is read access disabled;
encrypting the first-layer encrypted data based on at least one of a second-layer encryption key and a second-layer cryptographic function to produce second-layer encrypted data;
determining an encryption status of a volume of a storage resource;
storing a variable indicating whether the volume is partially encrypted or decrypted; and
booting from the volume of the storage resource and continuing encryption of items of data from the storage resource in response to a determination that the variable indicates that the volume is partially encrypted or decrypted, wherein completion of the encryption of the items of data results in full volume encryption (FVE) or full disk encryption (FDE).

17. The method according to claim 16, further comprising encrypting the second-layer encrypted data based on at least one of a third-layer encryption key and a third-layer cryptographic function to produce third-layer encrypted data.

18. The method according to claim 16, wherein the first-layer encryption key and the first-layer cryptographic function are unique to a first component of an information handling system and the second-layer encryption key and the second-layer cryptographic function are unique to a second component different than the first component.

19. The method according to claim 18, wherein each of the first component and the second component comprises one of: a user of the information handling system, the processor of the information handling system, the storage resource of the information handling system, a bus via which the storage resource of the information handling system is coupled, a cryptoprocessor of the information handling system, and an encryption accelerator of the information handling system.

20. The method according to claim 16, further comprising:
decrypting the second-layer encrypted data based on at least one of the second-layer encryption key and the second-layer cryptographic function to produce first-layer encrypted data; and
decrypting the first-layer encrypted data based on at least one of the first-layer encryption key and the first-layer cryptographic function to produce the item of data.

* * * * *